UNITED STATES PATENT OFFICE.

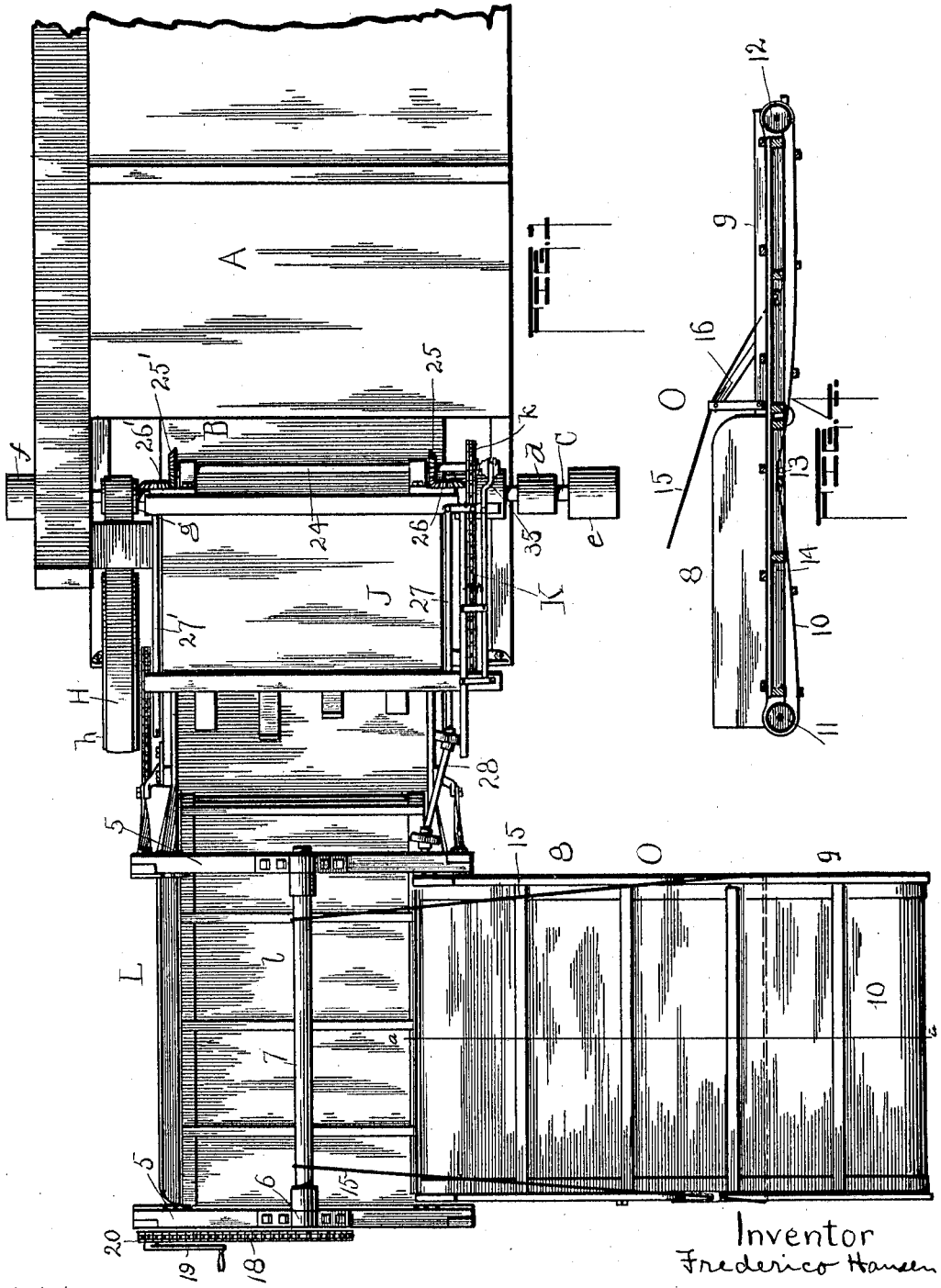

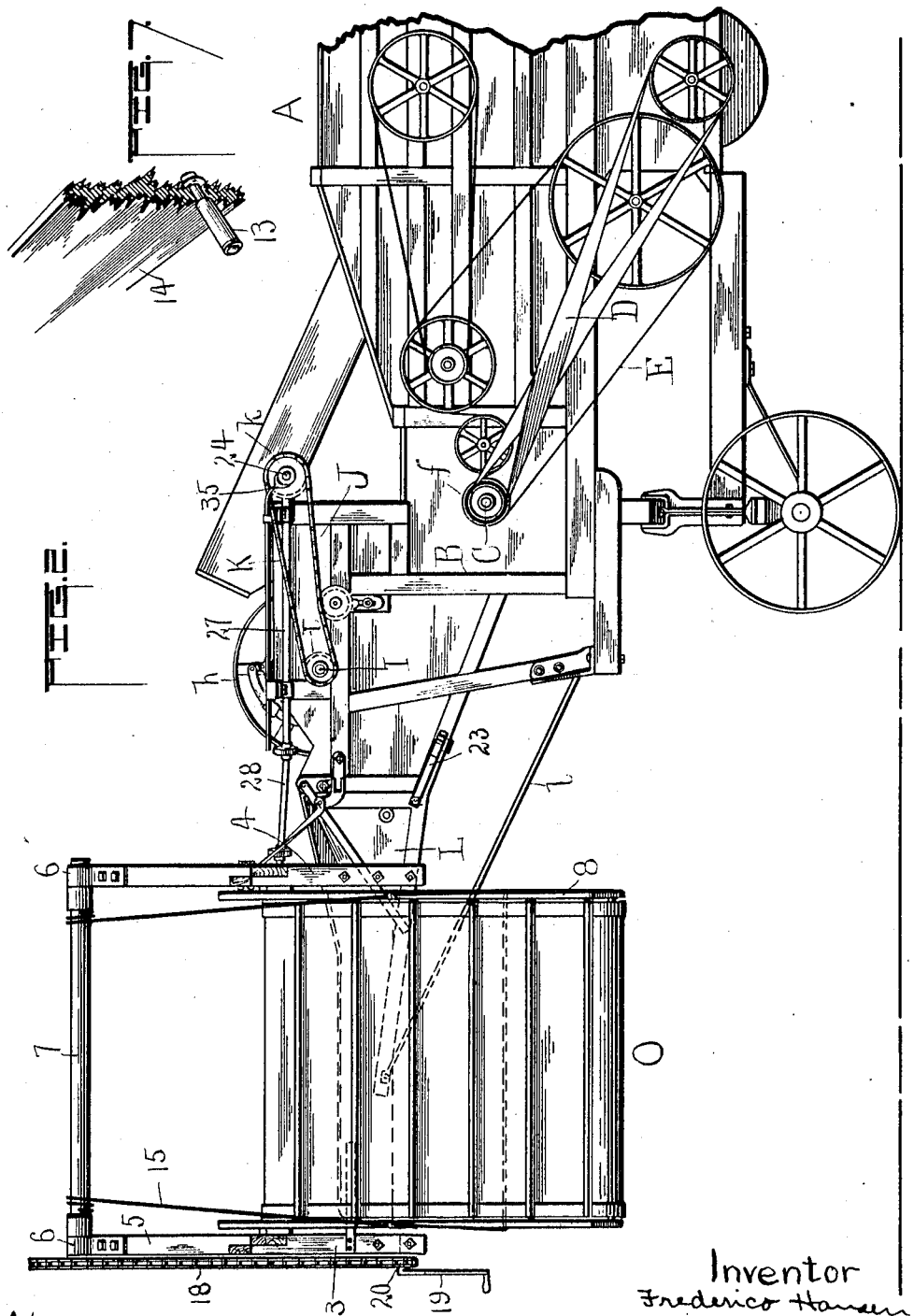

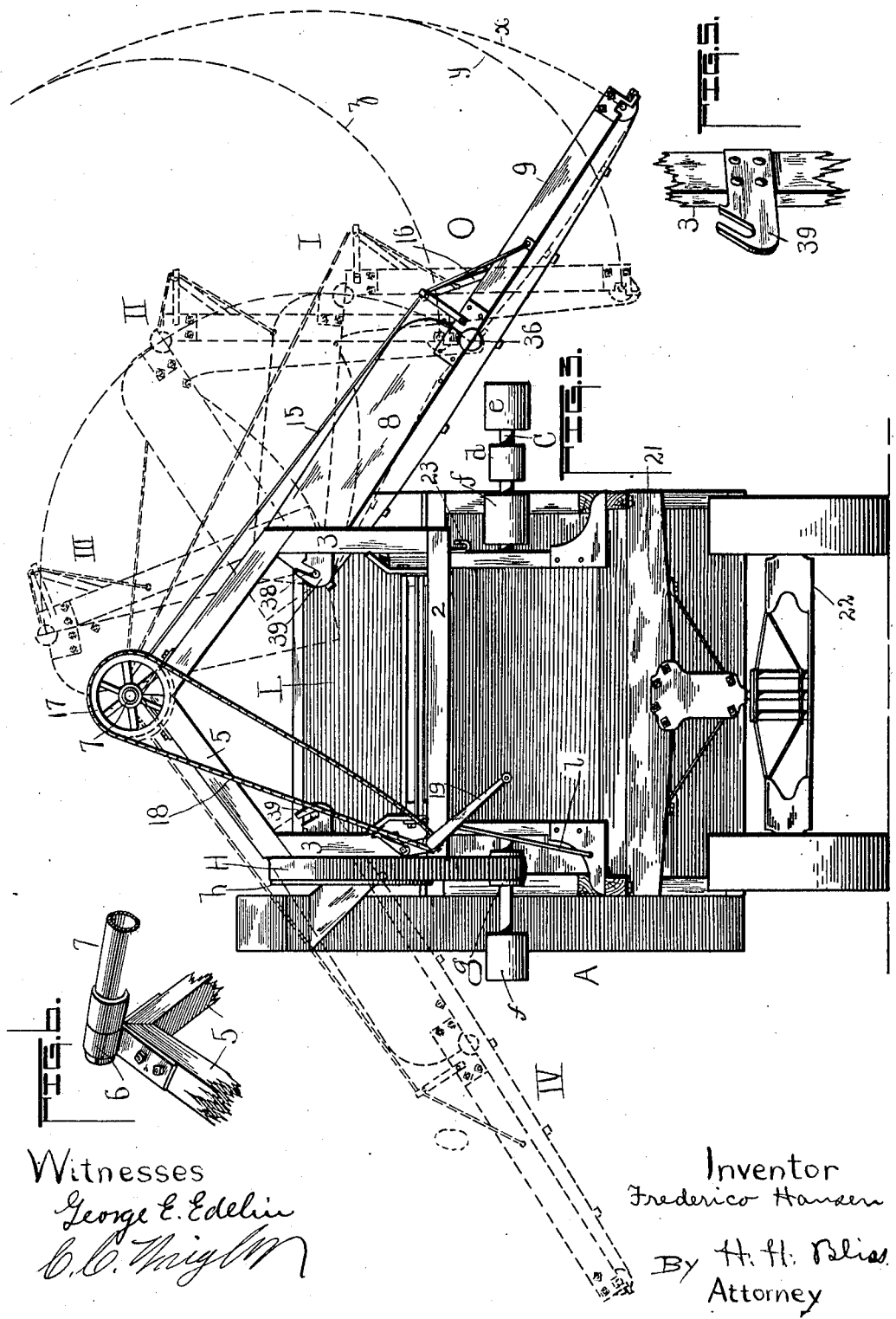

FREDERICO HANSEN, OF BUENOS AIRES, ARGENTINA, ASSIGNOR, BY MESNE ASSIGNMENTS, TO AVERY COMPANY, A CORPORATION OF ILLINOIS.

FEEDING MECHANISM FOR THRESHING-MACHINES.

1,026,261. Specification of Letters Patent. Patented May 14, 1912.

Application filed July 11, 1907. Serial No. 383,347.

*To all whom it may concern:*

Be it known that I, FREDERICO HANSEN, a citizen of the United States, residing at Buenos Aires, Argentina, have invented certain new and useful Improvements in Feeding Mechanism for Threshing-Machines, of which the following is a specification, reference being had therein to the accompanying drawing.

This invention relates to feeders for threshing machines, and has for its object to produce an attachment of this character possessing novel features of construction and arrangement and adapted to deliver the straw to be threshed from relatively long ricks or stacks.

In the accompanying drawings—Figure 1 is a plan view of a portion of a threshing machine, and of a feeder embodying my invention secured thereto. Fig. 2 is a side elevation, and Fig. 3 is a rear elevation of the parts represented in Fig. 1. Fig. 4 is a longitudinal sectional view of the laterally extending adjustable straw carrier. Fig. 5 is a detail view of one of the supporting devices for the inner end of the transverse conveyer frame. Fig. 6 is a detail view of one of the mountings for the winding shaft. Fig. 7 is a detail view of one of the medial supporting devices for the lower run of the transverse conveyer aprons.

In the drawings, A represents the rear portion of a threshing machine, which may be of any usual or preferred construction.

B represents that part of the casing which incloses the cylinder and concave, the former being mounted upon the shaft C. This shaft is provided with a pulley $f$ around which passes the main driving belt, and with other pulleys $d$, $e$ and $g$. Around the pulley $d$ passes the belt D that drives the fan, and the belt E that drives the beater, and the pitman shaft engages with the pulley $e$. A belt H engaging with the pulley $g$ drives the band cutting devices, the pulley $h$ of which is shown. The band cutters and devices for feeding the straw after the bands are severed is inclosed by the portion J of the casing. A pulley $i$ is mounted on the shaft I of the band cutter, and is connected by the belt or band K with a pulley $k$, mounted upon a transversely arranged shaft 24 suitably mounted in the upper part of the thresher frame work or casing. In rear of the portion of the casing in which are mounted the band cutters is situated a longitudinally arranged conveyer or carrier L provided with an endless apron or belt $l$ adapted to receive the straw and convey it toward the band cutters and feeders.

The parts thus far described, may be of any usual or preferred construction.

The rearward extending longitudinally disposed conveyer carries a frame adapted to support the inner end of a laterally arranged carrier O. This frame comprises a rear cross bar 2, uprights 3—3 rising therefrom, and front uprights 4 secured to and rising from the sides of the frame of the carrier L. Inclined supporting bars 5—5 are secured to the upper ends of the uprights 3 and 4 and are secured together at their upper ends by the metallic connecting pieces 6. The latter are constructed to form bearings in which is mounted a rotatable shaft 7.

The laterally extending carrier or conveyer O is formed of two sections pivotally connected,—an inner section 8 and an outer section 9. In the frame thus formed there is mounted an endless apron or belt 10 adapted to travel around the supporting rolls 11 and 12, the former being located at the inner end of the inner section of the carrier frame, and the latter at the outer end of the outer section. In order to prevent the lower run or leg of the endless belt from sagging unduly, I provide the side bearings 14 of the inner section of the conveyer with inwardly extending pins or rods 13 over which pass the edge portions of the apron or belt, these pins being preferably arranged as indicated in Fig. 7 and carrying anti-friction sleeves or rollers.

The inner end of the laterally extending conveyer O is detachably supported by the rearward longitudinal conveyer L which is provided with a pair of recessed lugs or hooks 39 adapted to receive pivot pins or shaft 38 carried by the conveyer O. The hooks 39 are open as clearly represented in Fig. 3 so that it is easy to drop the pins or ends of the shaft 38 thereinto and thus connect the two carriers. The outer end of the carrier O is sustained in a suspended position by ropes or cords 15, the inner ends of which are wound upon the shaft 7. The cords are connected at their outer ends to the outer section 9 of the conveyer and are supported intermediate between their ends by frames 16 situated near the inner ends of the outer section, which serve to hold the cords in an elevated position, or radially distant from the axis 36 of the hinges that unite the two sections 8 and 9. To the end of the shaft 7 there is secured a wheel 17, connected, by a sprocket chain or band 18, with a pinion 20 mounted on a short shaft, that is preferably supported in the cross bar 2 of the frame work, and is provided with a crank handle 19. By turning this handle the shaft 7 is rotated and the cords 15 let off or wound upon the shaft 7 to adjust the position of the laterally extending conveyer. The curve followed by the outer portion of the conveyer as it is adjusted up or down when fully extended, is indicated by the dotted line $x$ in Fig. 3. In this figure I have represented how the lateral carrier may be folded up over the longitudinal conveyer, as when it is desired to transport or store the apparatus.

The position of the parts indicated in dotted lines at I is that assumed by them at the first stage of the folding operations. Starting with the parts in the position represented in full lines, the attendant lifts upon the carrier, applying pressure at about the line 36 where the two sections join or are pivoted together. This causes the sections as a whole to buckle, the inner section 8 rising about the pivot 38, while the outer section moves downward until it assumes substantially a vertical position. If, now, the cords be wound upon the shaft 7 the parts may be brought first to the position indicated in dotted lines at II, and later to that represented at III. When in this last position the free end of the outer section is drawn in toward the lower side of the inner section, and the latter rests against the shaft 7, the parts thus being brought into compact relations with each other, where they are held by the cords 15 until they are again unwound. A reverse movement of the parts restores the conveyer to working position. If the parts are in the position indicated in dotted lines at I, the outer section can be swung out, extending the carrier, the outer end of the section 9 following the curve $y$. The carrier would then be supported in position inclining downward but little below the horizontal. The dotted line $z$ indicates the path that would be followed by the outer end of the outer section if it were extended from the position indicated at II. The laterally extending conveyer or carrier may be easily disconnected from the carrier L by lifting its inner end from engagement with hooks 39. It can then be transferred to and supported at the opposite side of the machine as indicated in dotted lines IV, Fig. 3.

The apron or belt 10 is driven through the following train of devices. 25 is a bevel wheel mounted upon the shaft 24, which, as stated, receives power from the shaft of the band cutter. With this bevel wheel meshes a wheel 26 mounted upon a shaft 27 supported in the frame work of the threshing machine. A coupling shaft 28 unites the shaft 27 with the shaft upon which is mounted the inner roll, 11, supporting the conveyer apron 10. The parts thus far described are connected together and employed when the conveyer O is situated on that side of the machine represented in Figs. 1, 2 and 3. Upon the opposite side of the machine there is arranged a train of gearing 25′, 26′ and 27′, corresponding with the parts 25, 26 and 27 already described. Whenever it is desired to change the laterally extending carrier or conveyer O to the position represented at IV, Fig. 3, the coupling shaft 28 is disconnected, the conveyer frame is shifted and the shaft 28 is then connected with the shaft 27′, uniting it with the shaft of the apron roll 11.

A clutch device, indicated as a whole by 35, is employed to connect, at will, the shaft 24 with the devices from which it receives its power.

What I claim is:—

1. The combination with a threshing-machine, of a longitudinally arranged straw feeder at the rear end thereof, a transversely arranged feeder pivoted to the side of the longitudinally arranged feeder and comprising an outer and an inner section, the outer section being pivoted to swing downward with respect to the inner section but limited in its upward movement to a position of alinement with respect to the inner section, an upstanding frame carried by the inner end of the outer section of the transverse feeder, a shaft mounted on the longitudinal feeder and above the same, a flexible draft device secured to the outer section, and adapted to pass in a straight line from the upper end of the said upstanding frame directly to the said shaft uninterrupted by parts of the inner section located above the straight line joining the axes of the pivotal connections of the inner section with the longitudinal feeder and the inner with the outer section, respectively, for all positions of adjustment of the transversely arranged feeder, and means for drawing the draft devices around the shaft.

2. The combination with a threshing machine, of a longitudinally arranged straw feeder at the rear end thereof, a transversely arranged feeder pivoted to the side of the longitudinally arranged feeder and comprising an outer and inner section, the outer section being pivoted to swing downward with respect to the inner section but limited in its upward movement to a position of alinement with respect to the inner section, a winding mechanism mounted above the axis of pivotal connection between the transverse feeder and longitudinal feeder, a rope wound upon the said winding mechanism at one end and secured at the other end to the inner end of the outer feeder section at a point approximately above the axis of pivotal connection between the outer and inner sections whereby the two sections may be swung upward from a downwardly and outwardly inclined position with the two sections in alinement, or can be swung from a downwardly and outwardly inclined position to the position of contact with the shaft of the winding mechanism with the outer section maintained constantly in a vertically depending position.

In testimony whereof I affix my signature, in presence of two witnesses.

FREDERICO HANSEN.

Witnesses:
A. L. GREGORY,
G. W. PERRY, Jr.

Copies of this patent may be obtained for five cents each, by addressing the "Commissioner of Patents, Washington, D. C."